United States Patent [19]

Yasuno

[11] Patent Number: 5,229,944
[45] Date of Patent: Jul. 20, 1993

[54] BRAKING FORCE CONTROL APPARATUS

[76] Inventor: Yoshiki Yasuno, 7-23, Deiki 1-chome,, Kanazawa-ku, Yokohama-shi, Kanagawa-ken, Japan

[21] Appl. No.: 673,297

[22] Filed: Mar. 22, 1991

[30] Foreign Application Priority Data

Mar. 22, 1990 [JP] Japan ................................ 2-73121
Aug. 21, 1990 [JP] Japan ................................ 2-219367

[51] Int. Cl.$^5$ ............................................. B60T 8/32
[52] U.S. Cl. ............................ 364/426.01; 303/100
[58] Field of Search .............. 364/426.01, 426.03, 364/424.05, 421.01; 303/91, 100

[56] References Cited

U.S. PATENT DOCUMENTS

| 4,758,053 | 7/1988 | Yashiki | 303/91 |
| 4,779,202 | 10/1988 | Leiber | 364/426.03 |
| 4,794,539 | 12/1988 | Wallentowitz et al. | 364/426.01 |
| 4,809,181 | 2/1989 | Ito et al. | 364/426.01 |
| 4,898,431 | 2/1990 | Karnopp et al. | 303/100 |
| 4,998,593 | 3/1991 | Karnopp et al. | 180/140 |
| 5,051,908 | 9/1991 | Shiraishi | 364/426.02 |
| 5,075,859 | 12/1991 | Mayr-Fröhlich et al. | 364/426.02 |

FOREIGN PATENT DOCUMENTS 0392164 10/1990 European Pat. Off. .
3731756 A1 9/1987 Fed. Rep. of Germany .

Primary Examiner—Thomas G. Black
Attorney, Agent, or Firm—Foley & Lardner

[57] ABSTRACT

A braking force control apparatus for use with an automotive vehicle. The braking forces applied to the left and right wheels of the vehicle are controlled to provide a target yaw rate calculated based upon a sensed steering angle and a sensed vehicle speed. For this control, a target difference between the braking forces applied to the left and right wheels is calculated from a vehicle model specifying a target braking force difference as a function or functions of target yaw rate, steering angle and vehicle speed. The vehicle model is obtained from equations of motions of the vehicle. The calculated braking force difference is used to set the braking forces to be applied to the left and right wheels.

5 Claims, 9 Drawing Sheets

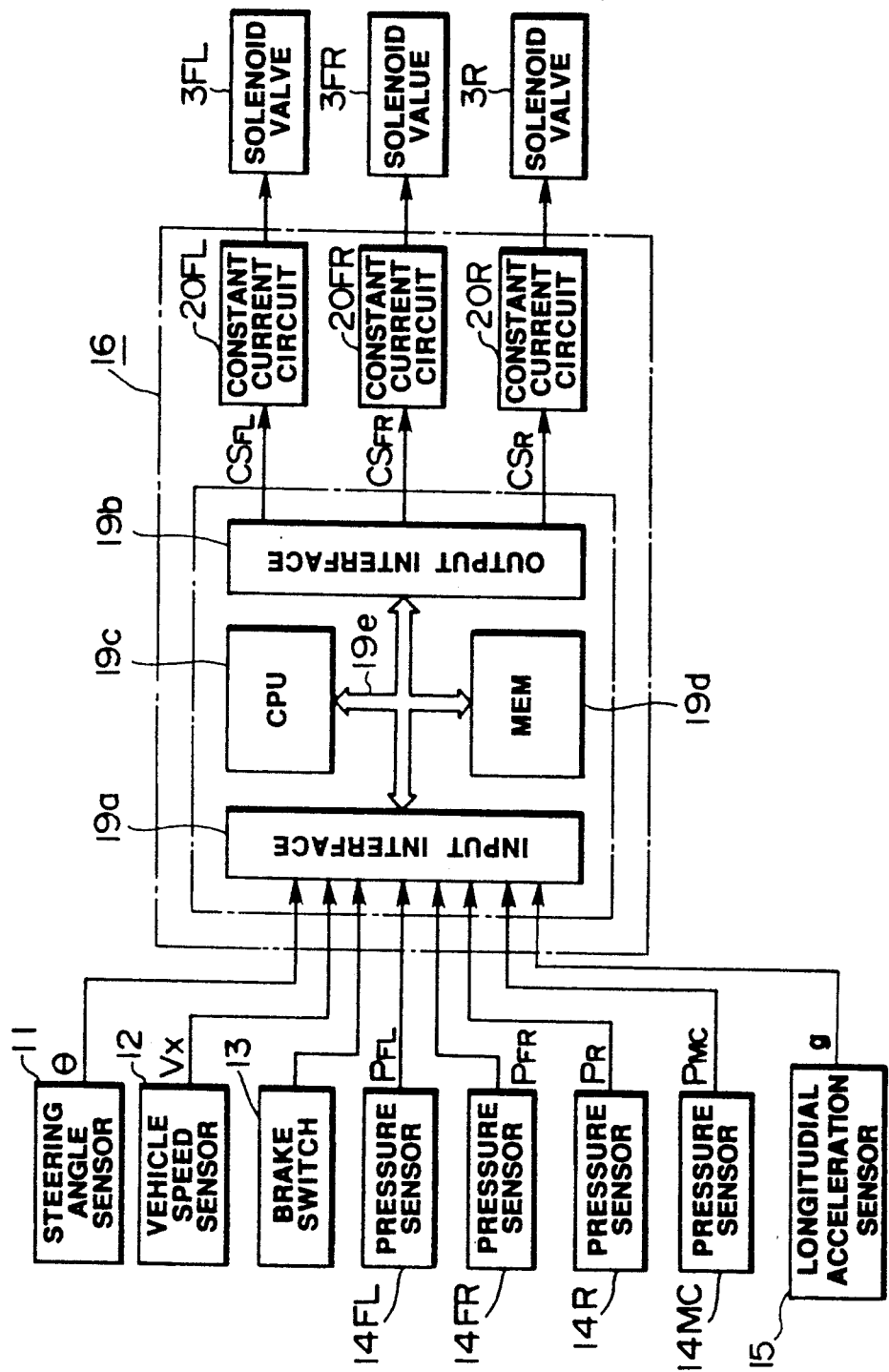

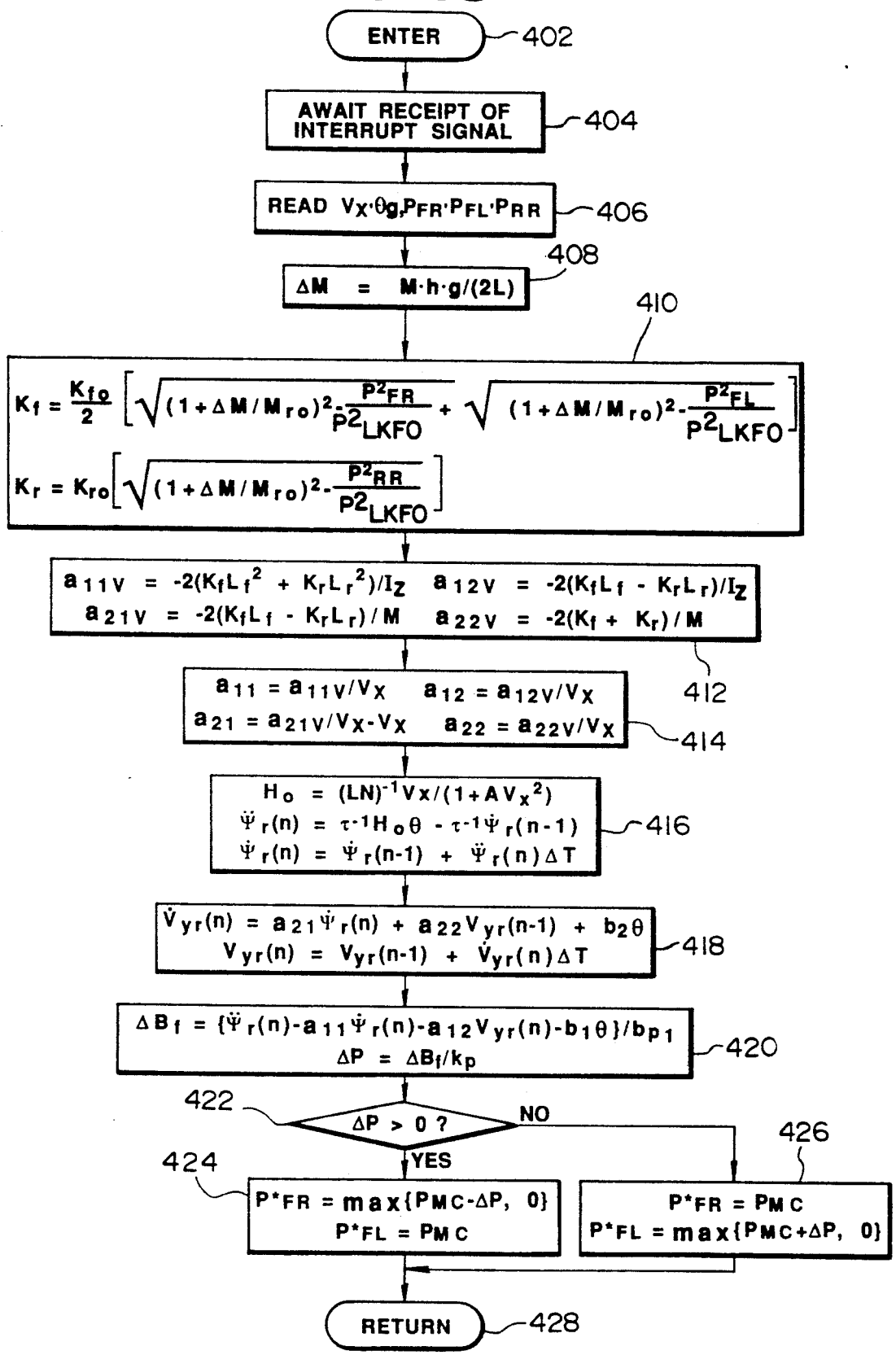

BRAKING FORCE CONTROL APPARATUS

BACKGROUND OF THE INVENTION

This invention relates to a braking force control apparatus for use with an automotive vehicle.

For example, Japanese Utility Model Kokai No. 59-155264 discloses a braking force control apparatus designed to adjust the vehicle yaw characteristic in such a manner as to provide a good vehicle heading performance by applying different braking forces to the left and right wheels of the vehicle. For this purpose, the braking force increase for the offside wheel is retarded when the brake pedal is depressed with the steering wheel being turned at an angle greater than a predetermined value with respect to its straight-ahead position.

With such a braking force control apparatus, however, it is impossible to control the yaw rate to an optimum value and to provide an improved transient yaw rate characteristic adjustment since the fact that the yaw rate, which is produced by the front wheel steering angle and the braking force difference, is dependent on the vehicle speed is not taken into account.

SUMMARY OF THE INVENTION

Therefore, it is a main object of the invention to provide an improved braking force control apparatus which can control the vehicle yaw rate to an optimum value.

Another object of the invention is to provide a braking force control apparatus which can provide an improved transient yaw rate characteristic.

There is provided, in accordance with the invention, a braking force control apparatus for use with an automotive vehicle supported on a pair of front wheels and a pair of rear wheels. The apparatus comprises means for controlling braking forces to be applied to the wheels of at least one of the wheel pairs, first sensor means sensitive to a vehicle steering condition for producing a first signal indicative of a sensed vehicle steering condition, second sensor means sensitive to a vehicle longitudinal speed for producing a second signal indicative of a sensed vehicle longitudinal speed, and a control unit coupled to the first and second sensor means for receiving the first and second signals. The control unit includes means for calculating a target yaw rate value based upon the sensed vehicle steering condition and the sensed vehicle longitudinal speed, and means for calculating a target difference between the braking forces from a vehicle model specifying a target braking force difference as a function of target yaw rate, vehicle steering condition and vehicle longitudinal speed. The vehicle model is derived from equations of motions of the vehicle. The control unit also includes means for setting the braking force control means to provide the calculated target braking force difference so as to provide the calculated target yaw rate.

BRIEF DESCRIPTION OF THE DRAWINGS

The invention will be described in greater detail by reference to the following description taken in connection with the accompanying drawings, in which:

FIG. 8 is a block diagram showing a control unit used in the braking force control apparatus of the third embodiment; and FIG. 9 is a flow diagram showing the programming of the digital computer as it is used in the third embodiment to calculate target values for the fluid pressures supplied to the wheel cylinders.

DETAILED DESCRIPTION OF THE INVENTION

Figure 1:
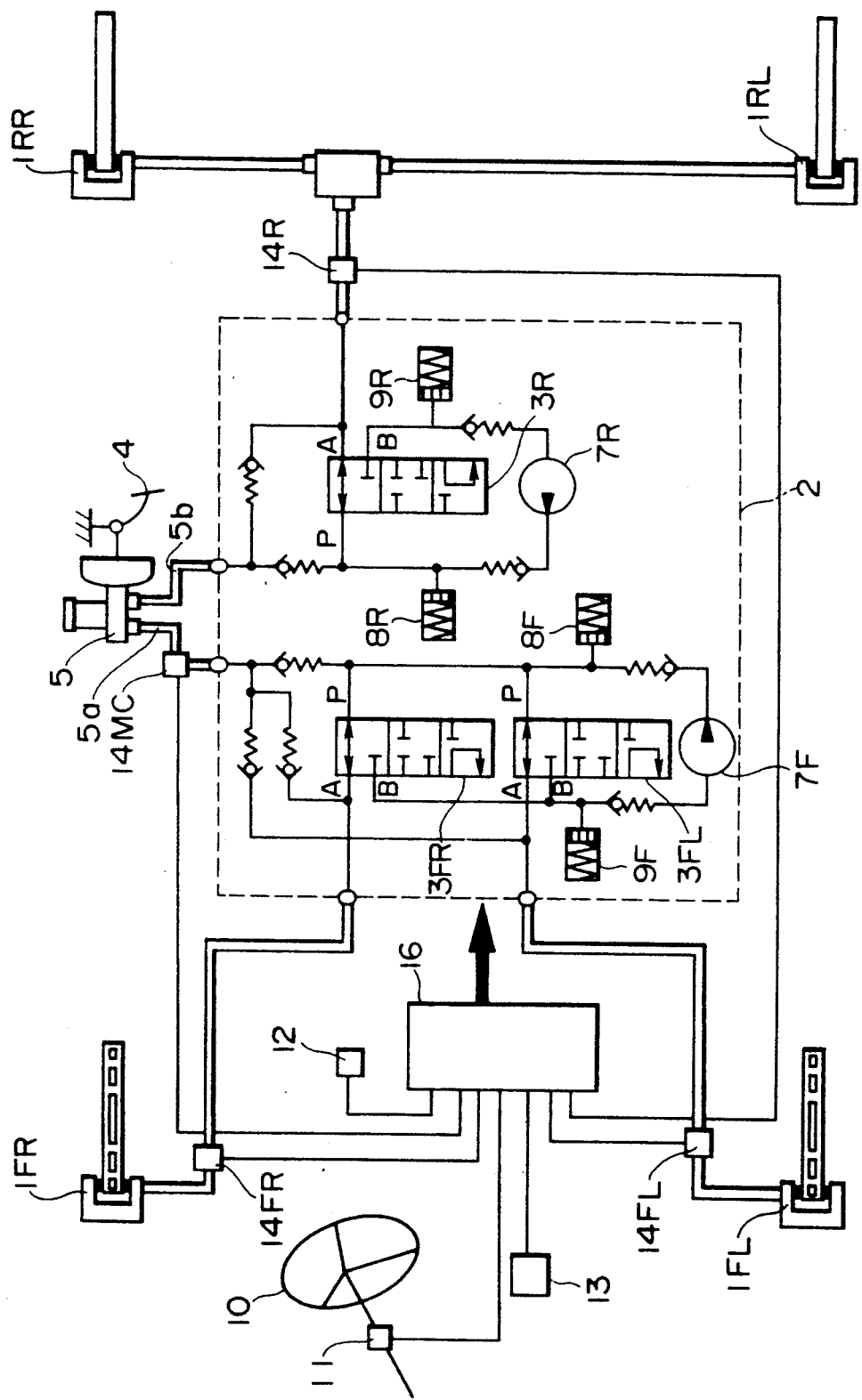
FIG. 1 is a schematic diagram showing a braking force control apparatus embodying the invention.

With reference to the drawings, and in particular to FIG. 1, there is shown a schematic diagram of a braking force control apparatus embodying the invention. The invention will be described in connection with an automotive vehicle supported on a pair of front road wheels associated with respective wheel cylinders 1FL and 1FR situated in front wheel brakes for application of brakes to the respective front road wheels and a pair of rear road wheels associated with respective wheel cylinders 1RL and 1RR situated in rear wheel brakes for application of brakes to the respective rear road wheels. An actuator, generally designated by the numeral 2, operates the wheel cylinders 1FL, 1FR, 1RL and 1RR for applying controlled braking forces to the respective road wheels. The numeral 3 designates a brake pedal which actuates the pistons in a tandem master cylinder 5 and forces fluid through first and second conduits 5a and 5b to the actuator 2.

The actuator 2 includes solenoid valves 3FL, 3FR and 3R. The solenoid valve 3FL has three ports A, B and P. The port P is connected to the first conduit 5a, the port A is connected to the wheel cylinder 1FL, and the port B is connected to the first conduit 5a through a motor driven pump 7F. A reservoir 9F is connected to the conduit connected between the port B and the pump 7F. An accumulator 8F is connected to the conduit connected between the pump 7F and the port P for charging up the fluid flow through the conduit. The solenoid valve 3FL operates on a command fed thereto from a control unit 16 to occupy one of three positions. The first position, illustrated in FIG. 1, is occupied to provide communication between the ports P and A so as to increase the fluid pressure introduced to the wheel cylinder 1FL. The second position is encountered to interrupts the communication between the ports P and A so as to retain the fluid pressure in the wheel cylinder 1FL at a constant valve. The third position is encountered to provide communication between the ports A and B so as to reduce the fluid pressure in the wheel cylinder 5L.

Similarly, the solenoid valve 3FR has three ports A, B and P. The port P is connected to the first conduit 5a and also to the port P of the solenoid valve 3FL, the port A is connected to the wheel cylinder 1FR, and the port B is connected to the port B of the solenoid valve 3FL. The solenoid valve 3FR operates on a command fed thereto from the control unit 16 to occupy one of three positions. The first position, illustrated in FIG. 1, is occupied to provide communication between the ports P and A so as to increase the fluid pressure introduced to the wheel cylinder 1FR. The second position is encountered to interrupt the communication between the ports P and A so as to retain the fluid pressure in the wheel cylinder 1FR at a constant value. The third position is encountered to provide communication between the ports A and B so as to reduce the fluid pressure in the wheel cylinder 1FR.

The solenoid valve 3R has three ports A, B and P. The port P is connected to the second conduit 5b, the port A is connected to the wheel cylinders 1RL and 1RR, and the port B is connected to the second conduit 5b through a motor driven pump 7R. A reservoir 9R is connected to the conduit connected between the port B and the pump 7R. An accumulator 8R is connected to the conduit connected between the pump 7R and the port P for charging up the fluid flow through the conduit. The solenoid valve 3R operates on a command fed thereto from the control unit 16 to occupy one of three positions. The first position, illustrated in FIG. 1, is occupied to provide communication between the ports P and A so as to increase the fluid pressure introduced to the wheel cylinders 1RL and 1RR. The second position is encountered to interrupt the communication between the ports P and A so as to retain the fluid pressure in the wheel cylinders 1RL and 1RR at a constant value. The third position is encountered to provide communication between the ports A and B so as to reduce the fluid pressure in the wheel cylinders 1RL and 1RR.

The levels of the respective current signals i1, i2, and i3 are repetitively determined from calculations performed by the control unit 16, these calculations being made based upon various conditions of the automotive vehicle that are sensed during its operation. These sensed conditions include steering angle $\theta$, vehicle speed Vx, brake pedal position, master cylinder pressure PMC, fluid pressures PFL and PFR supplied to the respective wheel cylinders 1FL and 1FR, and fluid pressure PR supplied to the wheel cylinders 1RL and 1RR. Thus, a steering angle sensor 11, a vehicle speed sensor 12, a brake switch 13, and fluid pressure sensors 14MC, 14FL, 14FR and 14R are connected to the control unit 16.

The steering angle sensor 11 is provided to sense the degree $\theta$ of rotation of a steering wheel 10 with respect to its neutral position and it produces an electric signal indicative of the sensed steering angle $\theta$. The steering angle indication signal has a sign indicating the direction to which the steering wheel turns. In the illustrated case, the steering angle indication signal has a positive sign when the steering wheel 10 turns to the left with respect to its neutral position and a negative sign with the steering wheel 10 turns to the right with respect to its neutral position. The vehicle speed sensor 12 is provided to sense the vehicle longitudinal speed Vx and it produces a signal indicative of the sensed vehicle speed Vx. The brake switch 13 is associated with the brake pedal 4 to close to supply current from the engine battery to the control unit 16 in response to the application of foot braking to the vehicle (when the brake pedal 3 is depressed). The master cylinder pressure sensor 14MC is shown as positioned in the first conduit 5a to sense the fluid pressure PMC and it produces an electrical signal indicative of the sensed pressure PMC of the fluid discharged from the master cylinder 5. The fluid pressure sensors 14FL and 14FR are positioned to sense the fluid pressures PFL and PFR introduced into the respective wheel cylinders 1FL AND 1FR. The fluid pressure sensors 14FL and 14FR produce electric signals indicative of the sensed fluid pressures sensor PFL and PFR to the control unit 16. The fluid pressure sensor 14R is positioned to sense the fluid pressure PF introduced into the wheel cylinders 1RL and 1RR. The fluid pressure sensors 14R produces an electric signal indicative of the sensed fluid pressure PR to the control unit 16.

Figure 2:
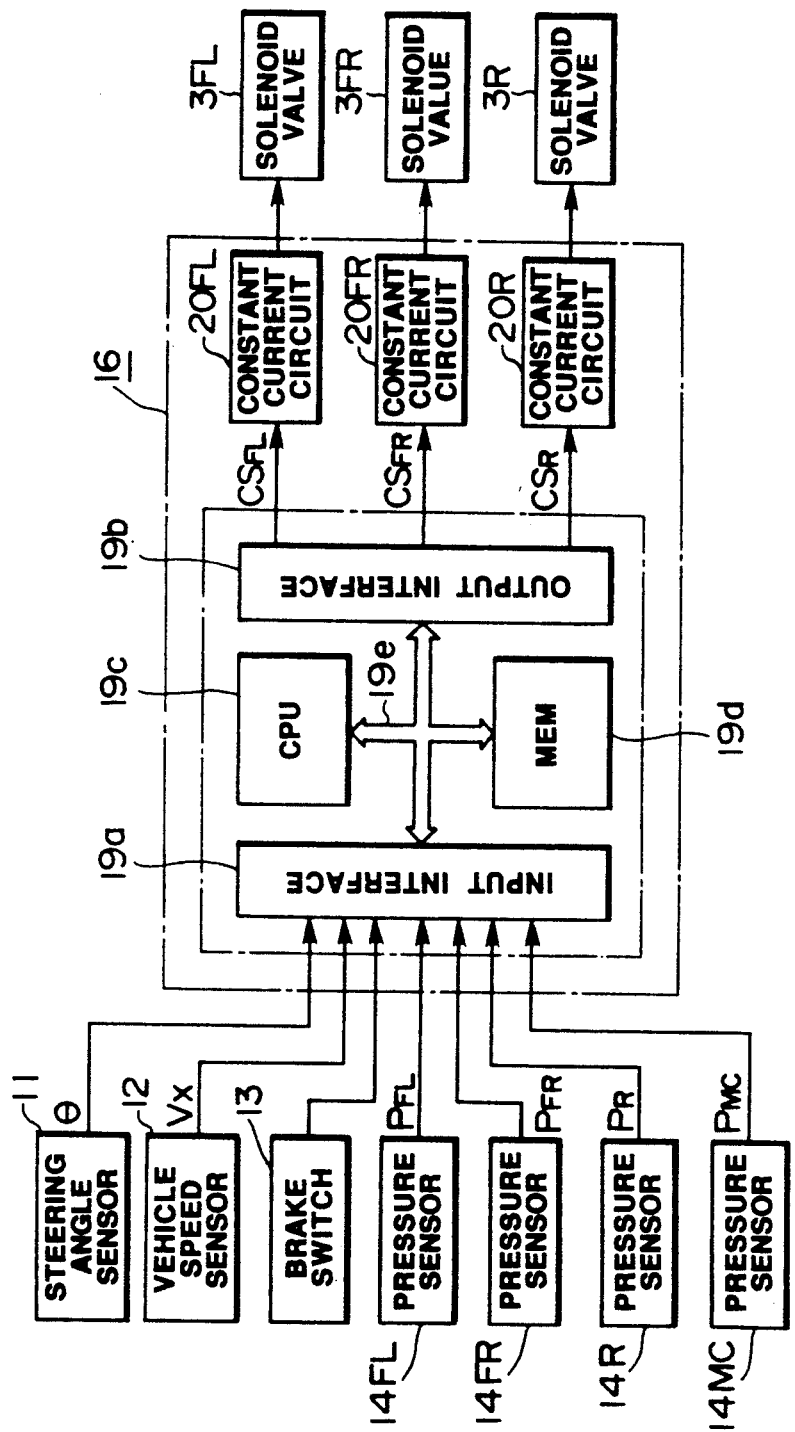
FIG. 2 is a block diagram showing a control unit used in the braking force control apparatus of the invention.

As shown in FIG. 2, the control unit 16 may employ a digital computer including an input interface 19a, an output interface 19b, a central processing unit (CPU) 19c, and a memory (MEM) 19d. The central processing unit 19c communicates with the rest of the computer via data bus 19e. The memory 19d contains programs for operating the central processing unit 19c and further contains appropriate data (vehicle model) used in calculating appropriate command signal values CSFL, CSFR and CSR. The vehicle model may be derived from equations of motions of a vehicle similar to the vehicle to be controlled. The calculated command signal values are transferred by the central processing unit 19c to the output interface 19b which converts them into analog form for application to respective floating type constant current circuits 20FL, 20FR and 20R. The constant current circuits 20FL, 20FR and 20R set the respective solenoid valves 3FL, 3FR and 3R according to the calculated values for them.

Figure 3:
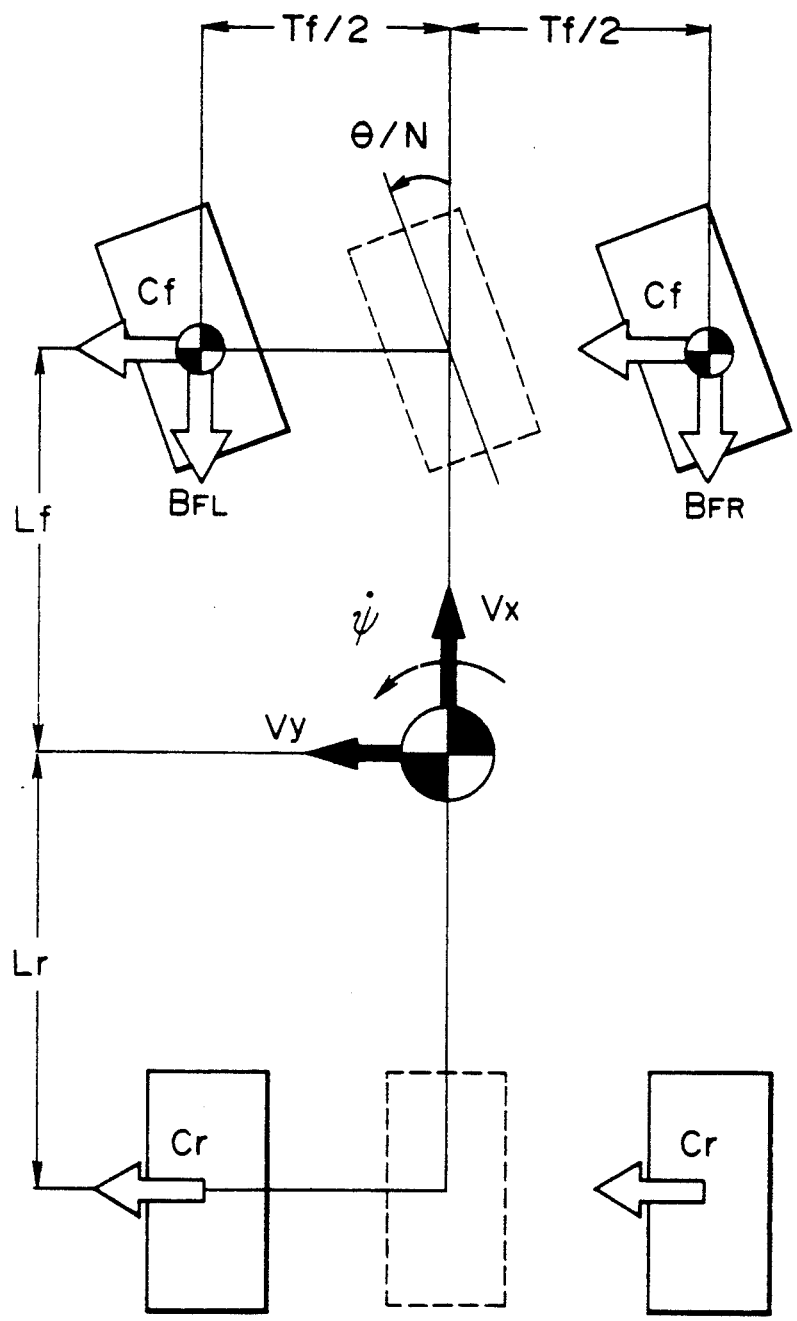
FIG. 3 is a diagram used in explaining the principles of a first embodiment of the invention.

The principles of a first embodiment of the invention will be described with reference to FIG. 3. Assuming now that the vehicle has two degrees of freedom, the first degree of freedom providing the socalled "yaw" motion corresponding to a rotation of the vehicle about its gravity center. The second degree of freedom provides the lateral motion of the vehicle. The following equations of motions are obtained:

$$Iz \cdot \dot{\psi}(t) = Cf \cdot Lf - Cr \cdot Lr + Tf \cdot \{B_{FL}(t) - B_{FR}(t)\}/2 \quad (1)$$

$$M \cdot Vy(t) = 2(Cf + Cr) - M \cdot Vx(t) \cdot \psi \quad (2)$$

where Iz is the yaw inertia moment of the vehicle, $\psi$ is the yaw rate, Lf is the distance between the gravity center of the vehicle and the front axle, Lr is the distance between the vehicle gravity center and the rear axle, Tf is the distance between the front wheels, $B_{FL}(t)$ is the braking force applied to the left front wheel, $B_{FR}(t)$ is the braking force applied to the right front wheel, M is the weight of the vehicle, Vy is the speed of lateral motion of the vehicle, Vy (t) is the acceleration of lateral motion of the vehicle, Vx is the speed of longitudinal motion of the vehicle, and Cf and Cr are the cornering forces of the front and rear wheels. The cornering forces Cf and Cr are given by:

$$Cf = Kf \cdot [\theta(t)/N - \{Vy + Lf \cdot \psi(t)/Vx(t)\}] \quad (3)$$

$$Cr = -Kr \cdot \{Vy - Lr \cdot \psi(t)\}/Vx(t) \quad (4)$$

where $\theta(t)$ is the steering angle, N is the steering gear ratio, Kr is the front-wheel cornering power, and Kr is the rear-wheel cornering power.

Substituting Equations (3) and (4) into Equations (1) and (2) gives $$\psi(t)=a11\cdot\psi(t)+a12\cdot Vy(t)+b1\cdot\theta(t)+b_{PL}\cdot\Delta Bf(t) \quad (5)$$

$$Vy(t)=a21\cdot\psi(t)+a22\cdot Vy(t)+a22\cdot Vy(t)+b2\cdot\theta(t) \quad (6)$$

where $$\Delta Bf(t)=B_{FL}(t)-B_{FR}(t) \quad (7)$$

$$a11=-2\cdot(Kf\cdot Lf\cdot Lf+Kr\cdot Lr\cdot Lr)/(Iz\cdot Vx) \quad (8)$$

$$a12=-2\cdot(Kf\cdot Lf-Kr\cdot Lr)/(Iz\cdot Vx) \quad (9)$$

$$a21=-2\cdot Kf\cdot Lf-Kr\cdot Lr)/(M\cdot Vx)-Vx \quad (10)$$

$$a22=-2\cdot(Kf+Kr)/(M\cdot Vx) \quad (11)$$

$$b1=2\cdot Kf\cdot Lf/(Iz\cdot N) \quad (12)$$

$$b2=2\cdot Kf/(M\cdot N) \quad (13)$$

$$bp1=Tf/(2\cdot Iz) \quad (14)$$

Using a differential operator S, Equations (5) and (6) may be modified to give the produced yaw rate $\psi 1$ in relation to the steering angle $\theta(t)$.

$$\psi 1(t) = \frac{(b1\cdot S + a12\cdot b2 - a22\cdot b1)}{S^2 - (a11 - a22)S + (a11\cdot a22 - a12\cdot a21)} \cdot \theta(t) \quad (15)$$

$$= X(S)\cdot \theta(t)$$

where X(S) is the transfer function taken in the form of (an equation of the first degree)/(an equation of the second degree). It is apparent from Equation (15) that the tendency of the produced yaw rate $\psi 1(t)$ to oscillate with respect to the steering angle $\theta(t)$ increases so as to degrade the vehicle steering performance as the vehicle speed Vx increases. The denominator of Equation (15) has a coefficient $\{-(a11+a22)\}$ related to the term of the first degree. This coefficient corresponds to the attenuation constant $\zeta$ of the control system. As can be seen from Equations (8) and (9), the values a11 and a12 are always negative and the attenuation constant $\zeta$ is always positive. In addition, the attenuation constant $\zeta$ comes closer to zero as the vehicle speed Vx increases. This means that, as the vehicle speed Vx increases, the attenuation constant $\zeta$ decreases and the tendency of the yaw rate $\psi 1(t)$ to oscillate increases.

Assuming now that the target yaw rate $\psi r(t)$ has a first order lag without any over- and under-shoot with respect to the steering angle $\theta(t)$ and its steady value is equal to that for normal vehicles, the target yaw rate $\psi r(t)$ is given by $$\psi r(t)=Ho\cdot\theta(t)/(1+\tau S) \quad (16)$$

where Ho is the steady yaw rate gain given by $$Ho=Vx/\{(1+A\cdot Vx^2)\cdot L\cdot N\} \quad (17)$$

where L is a wheel base, and A is a stability factor given by $$A = \frac{-M\cdot (Lf\cdot Kf - Lr\cdot Kr)}{2\cdot L^2\cdot Kf\cdot Kr} \quad (18)$$

Since the steady value is set at a value equal to that of normal vehicles in Equation (16), the main object of the invention is not to provide an improved vehicle heading performance during vehicle braking like the conventional braking force control apparatus described hereinbefore. According to the invention, a target yaw rate, which is determined by the sensed steering angle $\theta$ and the sensed vehicle speed, is achieved to provide an improved vehicle steering stability.

Description will be made to the manner in which the produced yaw rate $\psi(t)$ is brought into coincidence with the target yaw rate $\psi r(t)$ using a difference $\Delta Br(t)$ between the braking forces applied to the left and right front wheels. Equation (16) may be modified to obtain Equation (19) which gives the differentiated value $\psi r(t)$ of the target yaw rate.

$$\psi r(t)=Ho\cdot\theta(t)/\tau-\psi r(t)/\tau \quad (19)$$

If the produced yaw rate $\psi(t)$ resulting from the steering angle $\theta(t)$ and the braking force difference $\Delta Br(t)$ is equal to the target yaw rate $\psi r(t)$, the differentiated values $\psi(t)$ and $\psi r(t)$ will be equal. It is assumed that $\psi r(t)=\psi(t)$, $\psi r(t)=\psi(t)$ and that $Vy(y)=Vyr(t)$ when $\psi r(t)=\psi(t)$ and $\psi r(t)=\psi(t)$. Substituting these values into Equations (5) and (6) gives $$\psi r(t)=a11\cdot\psi r(t)+a12\cdot Vyr(t)+b1\cdot\theta(t)+bp1\cdot\Delta Bf(t) \quad (20)$$

$$Vyr(t)=a21\cdot\psi r(t)+a22\cdot Vyr(t)+b2\cdot\theta(t) \quad (21)$$

Substituting Equation (19) into Equation (29) and solving for the braking force difference $\Delta Br(t)$ gives $$\Delta Br(t) = \frac{\psi r(t) - a11\cdot\psi r(t) - a12\cdot Vyr(t) - b1\cdot\theta(t)}{bp1} \quad (22)$$

To provide the braking force difference $\Delta Bf(t)$, a pressure difference may be provided between the wheel cylinders 1FL and 1FR. If the inertia moments of the road wheels are neglected, the braking force Bf is given by $$Bf=2\cdot\mu p\cdot Ap\cdot rp\cdot P/R=kp\cdot P \quad (23)$$

where $$kp=2\cdot\mu p\cdot Ap\cdot rp/R \quad (24)$$

$\mu p$ is the coefficient of friction between the brake pad and the disc rotor, Ap is the area of the wheel cylinder, rp is the effective radius of the disc rotors, and R is the radius of the road wheels.

Thus, the target value $\Delta P(t)$ for the difference between the fluid pressures applied to the left and right front wheel cylinders 1FL and 1FR is given by $$\Delta P(t)=\Delta Bf(t)kp \quad (25)$$

Using the target value $\Delta P(t)$ and the master cylinder pressure PMC(t), the target values PFL(t) and PFR(t) for the fluid pressures supplied to the left and right front wheel cylinders 1FL and 1FL are calculated as $$\begin{aligned} P^*_{FL}(t) &= P_{MC}(t) \quad (\Delta P(t) \geq 0) \quad (26)\\ &= P_{MC}(t) + \Delta P(t) \\ &\quad \{\Delta P(t) < 0 \text{ and } P_{MC}(t) > -\Delta P(t)\} \\ &= 0 \\ &\quad \{\Delta P(t) < 0 \text{ and } P_{MC}(t) \leq -\Delta P(t) \end{aligned}$$

-continued $$P^*_{FR}(t) = P_{MC}(t) \quad (\Delta P(t) < 0) \qquad (27)$$
$$= P_{MC}(t) - \Delta P(t)$$
$$\{\Delta P(t) \geq 0 \text{ and } P_{MC}(t) > \Delta P(t)\}$$
$$= 0$$
$$\{\Delta P(t) \geq 0 \text{ and } P_{MC}(t) \leq \Delta P(t)\}$$

Figure 4:
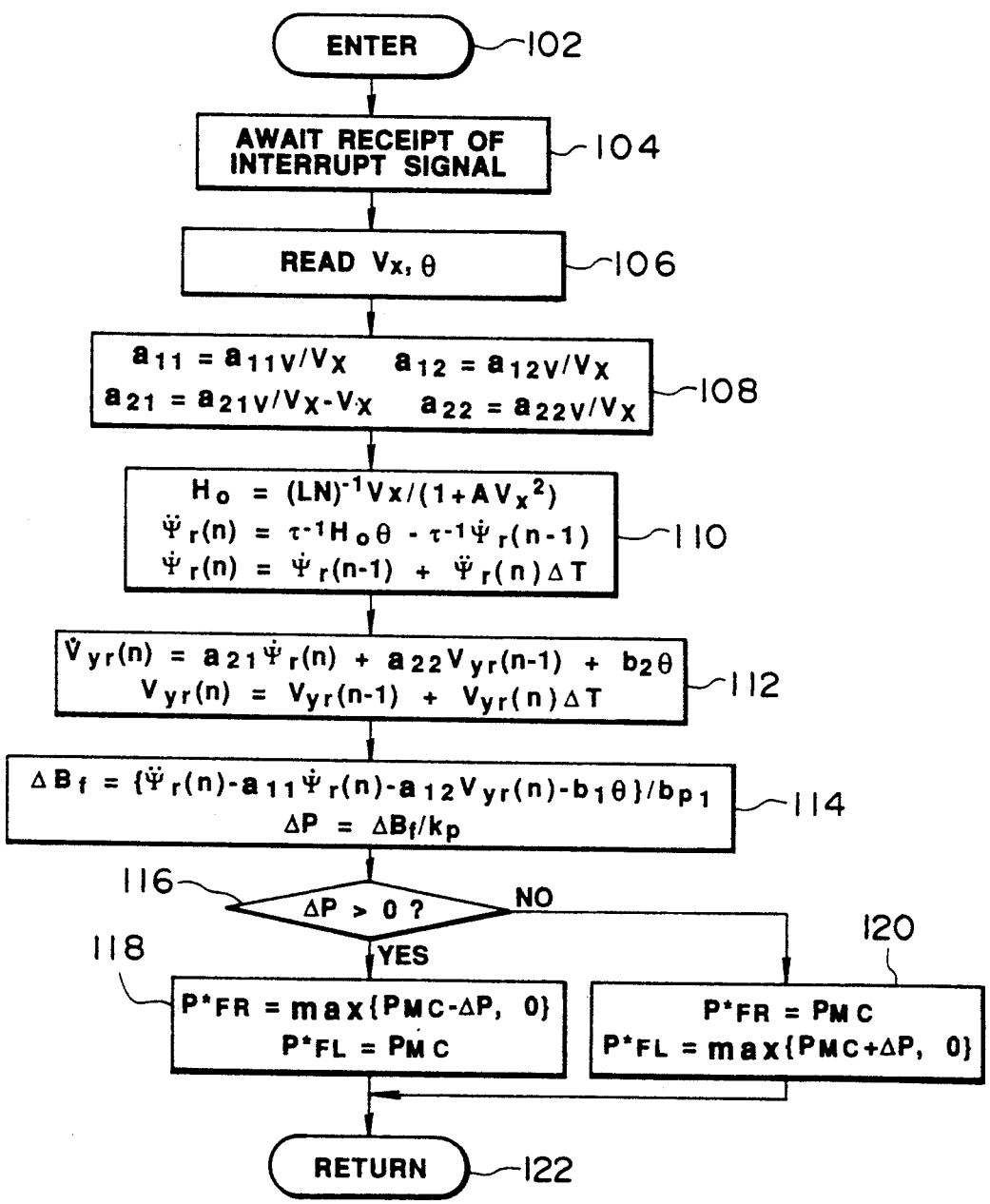
FIG. 4 is a flow diagram showing the programming of the digital computer as it is used to calculate target values for the fluid pressures supplied to the wheel cylinders.

FIG. 4 is a flow diagram illustrating the programming of the digital computer as it is used to calculate target values P*FL(t) and P*FR(t) for the fluid pressures to be supplied to the wheel cylinders 1FL and 1FR.

The computer program is entered at the point 102. At the point 104 in the program, the central processing unit 19c awaits the receipt of an interrupt signal produced at uniform interval of time ΔT (for example, 5 msec). After the receipt of this interrupt signal, at the point 106 in the program, the steering angle θ and the vehicle speed Vx are read into the computer memory 19d. At the point 108 in the program, coefficients a11, 1a2, a21 and a22 are calculated, from Equations (8) to (11), as a11=a11V/Vx, a12=a12V/Vx, a21=a21V/Vx −Vx and a22=a22V/Vx where a11V, a12V, a21V and a22V are constants previously calculated from the following equations:

$$a11V = -2 \cdot (Kf \cdot Lf^2 + Kr \cdot Lr^2)/Iz \qquad (28)$$

$$a12V = -2 \cdot (Kf \cdot Lf - Kr \cdot Lr)/Iz \qquad (29)$$

$$a21V = -2 \cdot Kr \cdot Lf - Kr \cdot Lr)/M \qquad (30)$$

$$a22V = -2 \cdot (Kf + Kr)/M \qquad (31)$$

At the point 110 in the program, the steady yaw rate gain Ho is calculated, from Equation (17), based upon the vehicle speed Vx, the stability factor A calculated from Equation (18), the wheel base L and the steering gear ratio N. The calculated steady yaw rate gain Ho is used to calculate the differentiated value ψr(n) of the target yaw rate from Equation (19). Furthermore, the present target yaw rate ψr(n) is calculated, from Equation (32), based upon the new differentiated yaw rate value ψr(n) calculated in the present cycle of execution of this program and the last differentiated yaw rate value ψr(n−1) calculated in the last cycle of execution of the program. The calculated target yaw rate value ψr(n) is used to update the last target yaw rate value stored in the computer memory 19d.

$$\psi r(n) = \psi r(n-1) + \psi r(n) \cdot \Delta T \qquad (32)$$

where ΔT is the time interval between successive interrupt signals.

At the point 112 in the program, the lateral acceleration Vyr(n) is calculated, from Equation (21), based upon the coefficients a21 and a22 calculated at the step 108, a coefficient b2 calculated previously from Equation (13), the target yaw rate ψr(n) calculated at the step 110, and the last lateral speed value Vyr(n−1). The calculated lateral acceleration value Vyr(n) is used along with the last lateral speed value Vyr(n−1) to calculate the present lateral speed Vyr(n) from Equation (33). The calculated lateral speed value Vyr(n) is used to update the last lateral speed value stored in the computer memory 19d.

$$Vyr(n) = Vyr(n-1) + Vyr(n) \cdot \Delta T \qquad (33)$$

At the point 114 in the program, the difference ΔBf between the braking forces applied to the left and right front wheels from Equation (22). The calculated braking force difference value ΔBf is used, along with the coefficient kp calculated previously from Equation (24), to calculate a target pressure difference value ΔP from Equation (25).

At the point 116 in the program, a determination is made as to whether or not the calculated target pressure difference value ΔP is positive. If ΔP>0, then the program proceeds to the point 118. Otherwise, the program proceeds to the point 120.

At the point 118 in the program, the master cylinder pressure PMC is set for the target cylinder pressure P*FL to be supplied to the wheel cylinder 1FL and a greater one of "0" and the difference (PMC−ΔP) between the master cylinder pressure PMC and the target pressure difference ΔP) is set for the target cylinder pressure P*FR to be supplied to the wheel cylinder 1FR. Following this, the program proceeds to the point 122 where the computer program returns to the entry point 102 to await the receipt of the next interrupt signal.

At the point 120 in the program, the master cylinder pressure PMC is set for the target cylinder pressure P*FR to be supplied to the wheel cylinder 1FR and a greater one of "0" and the difference (PMC−ΔP) between the master cylinder pressure PMC and the target pressure difference ΔP) for the target cylinder pressure P*FL to be supplied to the wheel cylinder 1FL. Following this, the program proceeds to the point 122 where the computer program returns to the entry point 102 to await the receipt of the next interrupt signal.

Assuming first that the vehicle continues to move in a straight line, the vehicle speed Vx sensed by the vehicle speed sensor 12 is equal to the speed of movement of the vehicle, the steering angle θ sensed by the steering angle sensor 11 is zero, and the last values ψr(n−1) and Vyr(n−1) of the target yaw rate and the lateral speed are zero. As a result, the steaty yaw rate gain Ho is proprtional to the vehicle speed Vx and the differentiated value ψr(n) of the target yaw rate is zero since the first term of the right side of Equation (19) is zero and the last target yaw rate value ψr(n−1) is zero. This leads to the fact that the target yaw rate ψr(n) calculated at the point 110 in the program of FIG. 4 is zero and the lateral acceleration and speed values Vyr(n) and Vyr(n) calculated at the point 112 in the program of FIG. 4 are zero. For this reason, the braking-force and traget-pressure difference values ΔBf and ΔP calculated at the point 114 in the program of FIG. 4 are zero. Consequently, the target wheel cylinder pressure values P*FL and P*FR are set at zero at the point 118 in the program of FIG. 4 since the master cylinder pressure PMC sensed by the pressure sensor 14MC in the absence of vehicle braking.

When the brake pedal 4 is depressed during the straight-ahead driving, the master cylinder pressure PMC discharged from the master cylinder 5 increases. In this case, the target wheel cylinder pressures P*FL and P*FR are set at a value equal to the master cylinder pressure PMC at the point 118 in the program of FIG. 4.

When the steering wheel 10 is turned to the left to turn the vehicle to the right from the straight-ahead driving condition, the steering angle θ sensed by the steering angle sensor 11 increases in a positive direction.

As a result, the differentiated target yaw rate value $\dot{\psi}r(n)$ calculated at the point 110 in the program of FIG. 4 is as a function of the sensed steering angle $\theta$ and the steady yaw rate gain Ho corresponding to the vehicle speed and the target yaw rate $\psi r(n)$ increases in a positive direction. This leads to the fact that the lateral acceleration and speed values Vyr(n) and Vyr(n) calculated at the point 112 in the program of FIG. 4 increase in a positive or negative direction. Based upon these calculated values, the braking-force and traget-pressure difference values $\Delta Bf$ and $\Delta P$ are calculated at the point 114 in the program of FIG. 4.

If the target pressure difference $\Delta P$ is negative, the target wheel cylinder pressure P*FL is set at a value equal to the master cylinder pressure PMC minus the target pressure difference $\Delta P$, whereas the target wheel cylinder pressure P*FR is set at a value equal to the master cylinder pressure PMC at the point 120 in the program of FIG. 4. This is effective to provides an appropriate yaw rate according to the vehicle speed and the steering angle.

If the target pressure difference $\Delta P$ is positive, the target wheel cylinder pressure P*FL is set at a value equal to the master cylinder pressure PMC, whereas the target wheel cylinder pressure P*FR is set at a value equal to the master cylinder pressure PMC plus the target pressure difference $\Delta P$ at the point 118 in the program of FIG. 4. This is effective to provides an appropriate yaw rate according to the vehicle speed and the steering angle.

When the steering wheel 10 is turne to the right to turn the vehicle to the right from the straightahead driving condition, the target wheel cylinder pressures P*FL and P*FR are set substantially in the same manner as described in connection with the case where the steering angle 10 is turned to the left except for the fact that the steering angle $\theta$ sensed by the steering angle sensor 11 is negative and the differentiated target yaw rate value $\dot{\psi}r(n)$ and the target yaw rate value $\psi r(n)$ are negative.

Figure 5:
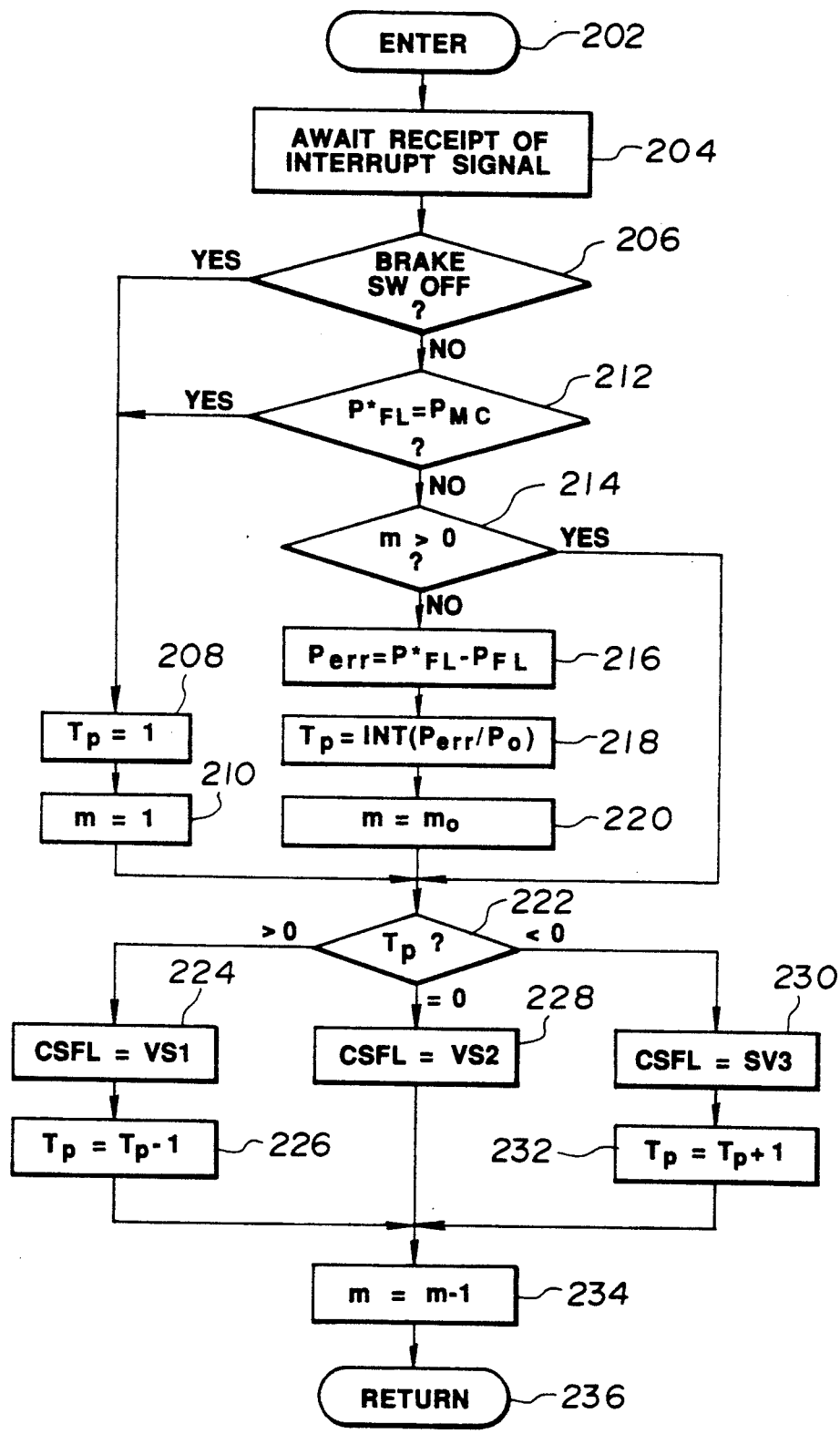
FIG. 5 is a flow diagram showing the programming of the digital computer as it is used to control the fluid pressures supplied to the wheel cylinders.

FIG. 5 is a flow diagram illustrating the programming of the digital computer as it is used to control the fluid pressure introduced to the wheel cylinder 1FL.

The computer program is entered at the point 202. At the point 204 in the program, the central processing unit 19c awaits the receipt of an interrupt signal produced at uniform interval of time $\Delta T$. After the receipt of this interrupt signal, at the point 206, a determination is made as to whether or not the brake switch 13 is off. If the answer to this question is "yes", then it means the absence of vehicle braking and the program proceeds to the point 208 where a first variable Tp is set at 1 and then to the point 210 where a second variable m is set 1. The first variable Tp indicates the time interval during which the control signal to be described later is retained, and the second variable m indicates time intervals at which an error between the actual cylinder pressure PFL and the target cylinder pressure P*FL is monitored. Upon completion of these settings, the program proceeds to the point 222.

If the brake switch 13 is on, then it means that brakes are applied to the vehicle and the program proceeds from the point 206 to another determination step at the point 212. This determination is as to whether or not the target cylinder pressure P*FL calculated in the program of FIG. 4 is equal to the master cylinder pressure PMC. If the answer to this question is "yes", then the program proceeds to the point 208. Otherwise, the program proceeds to the point 214.

At the point 214 in the program, a determination is made as to whether or not the second variable m is greater than zero. If the answer to this question is "yes", then the program proceeds to the step 222. Otherwise, the program proceeds to the point 216 where an error Perr (=P*FL−PFL) between the actual and target values P*FL and PFL of the pressure applied to the wheel cylinder 1FL and then to the point 218 where the first variable Tp is calculated as $$Tp = INT(Perr/Po) \qquad (34)$$

where Po is a reference value indicating an acceptable range and INT means to round to the nearest whole number. At the point 220 in the program, the second variable m is set at a predetermined value mo. Upon completion of this setting, the program proceeds to the point 222.

At the point 222 in the program, a determination is made as to whether the first variable Tp is positive, negative or zero. If the first variable Tp is positive, then the program proceeds to the point 224 where a command is produced to output a control signal CSFL having a first value VS1 causing the constant current circuit 20FL to hold the solenoid valve 3FL in the first position increasing the fluid pressure to the wheel cylinder 1FL and then to the point 226 where 1 is added to the first variable Tp. The new value (Tp−1) of the first variable is used to update the last first variable value stored in the computer memory 19d. Following this, the program proceeds to the point 234.

If the first variable Tp is zero, then the program proceeds from the point 222 to the point 228 where a command is produced to output a control signal CSFL having a second value VS2 causing the constant current circuit 20FL to move the solenoid valve 3FL to the second position retaining the fluid pressure in the wheel cylinder 1FL. Following this, the program proceeds to the point 234.

If the first variable Tp is negative, then the program proceeds to the point 230 where a command is produced to output a control signal CSFL having a third value VS3 causing the constant current circuit 20FL to move the solenoid valve 3FL to the third position decreasing the fluid pressure in the wheel cylinder 1FL and then to the point 232 where 1 is added to the first variable Tp. The new value (Tp+1) is used to update the last value of the first variable stored in the computer memory 19d. Following this, the program proceeds to the point 234.

At the point 234 in the program, 1 is substracted from the second variable m. The new value (m−1) of the second variable is used to update the last second variable value stored in the computer memory 19d. Following this, the program proceeds to the point 236 where the computer program returns to the entry point 202 to await the receipt of the next interrupt signal.

A similar program is executed separately at uniform intervals of time $\Delta T$ for controlling the fluid pressure introduced to the wheel cylinder 1FR.

When the vehicle is traveling in the absence of vehicle braking, the brake switch 13 is off and the first variable Tp is set at 1. As a result, the control signal CSFL has a first value VS1 causing the solenoid valve 3FL to be held in the first or normal position providing communication between the master cylinder 5 and the wheel cylinder 1FL, whereas the control signal CSFR has a first value VS1 causing the solenoid valve 3FR to be held in the first or normal position providing communication between the master cylinder 5 and the wheel cylinder 1FR. Since the master cylinder pressure discharged from the master cylinder 5 is zero in the absence of vehicle braking, the pressures in the wheel cylinders 1FL and 1FR are zero so that no braking force is produced.

When the brake pedal 4 is depressed, a determination is made as to whether or not the target cylinder pressures P*FL and P*FR calculated in the program of FIG. 4 are equal to the master cylinder pressure PMC discharged from the master cylinder 5. This determination corresponds to a determination whether the vehicle is moving in a straight line or turning in a circle. If the vehicle is moving in a straight line, the target cylinder pressures P*FL and P*FR will be set at a value equal to the master cylinder pressure PMC, as described in connection with the program of FIG. 4, and the control signal CSFL has a first value VS1 causing the solenoid valve 3FL to be held in the first or normal position providing communication between the master cylinder 5 and the wheel cylinder 1FL, whereas the control signal CSFR has a first value VS1 causing the solenoid valve 3FR to be held in the first or normal position providing communication between the master cylinder 5 and the wheel cylinder 1FR. As a result, the cylinder pressures PFL and PFR in the respective wheel cylinders 1FL and 1FR increase to a value equal to the master cylinder PMC. For this reason, substantially the same braking force is produced in the wheel cylinders 1FL and 1FR.

If the brake pedal 4 is depressed while the vehicle is turning in a circle or if the vehicle turns with the brake pedal 4 being depressed, the target cylinder pressure P*FL (or P*FR) will be set at a value equal to the master cylinder pressure PMC minus the target pressure difference ΔP, as described in connection with the program of FIG. 4. Since the second variable m is set at zero at the point 234 during the last cycle of execution of the program of FIG. 5, an error Perr between the actual cylinder pressure PFL (or PFR) sensed by the pressure sensor 14FL (or 14FR) and the target cylinder pressure P*FL (or P*FR) is calculated at the point 216 in the program of FIG. 5, and the first variable Tp is set at a value INT(Perr/Po) at the point 218 in the program of FIG. 5, and the second variable m is set at a predetermined value mo at the point 220 in the program of FIG. 5.

If the actual cylinder pressure PFL (or PFR) is less than the target cylinder pressure P*FL (or P*FR), the first variable Tp will be positive. Consequently, the control signal CSFL has a first value VS1 causing the solenoid valve 3FL to be held in the first or normal position providing communication between the master cylinder 5 and the wheel cylinder 1FL, whereas the control signal CSFR has a first value VS1 causing the solenoid valve 3FR to be held in the first or normal position providing communication between the master cylinder 5 and the wheel cylinder 1FR. This pressure increasing mode continues until the first variable Tp is reduced to zero at the point 226 in the program of FIG. 5.

When the first variable Tp reaches zero, the control signal CSFL (or CSFR) has a second value VS2 causing the solenoid valve 3FL (or 3FR) to move to the second position interrupting communication between the master cylinder 5 and the wheel cylinder 1FL (or 1FR) so as to retain the fluid pressure PFL (or PFR) in the wheel cylinder 1FL (or 1FR) at a constant value. This pressure retaining mode continues until the second variable m is reduced to zero at the point 234 in the program of FIG. 5.

When the second variable m reaches zero, an error Perr between the actual cylinder pressure PFL (or PFR) sensed by the pressure sensor 14FL (or 14FR) and the target cylinder pressure P*FL (or P*FR) is calculated at the point 216 in the program of FIG. 5, and the first variable Tp is set at a value INT (Perr/Po) at the point 218 in the program of FIG. 5, and the second variable m is set at a predetermined value mo at the point 220 in the program of FIG. 5. When the error Perr decreases to a value less than one-half of the reference pressure Po, the first variable Tp is set at zero and thus the pressure retaining mode is selected so that the cylinder pressure PFL (or PFR) is retained at the target cylinder pressure P*FL (or P*FR). When the cylinder pressure PFL (or PFR) in the wheel cylinder 1FL (or 1FR) is greater than the target cylinder pressure P*FL (or P*FR), the error Perr is negative and thus the first variable Tp is negative. As a result, the control signal CSFL (or CSFL) has a third value VS3 causing the solenoid valve 3FL (or 3FR) to move to the third position providing communication of the wheel cylinder 1FL (1FR) to the master cylinder 5 through the pump 7G so as to reduce the cylinder pressure PFL (or PFR) in the wheel cylinder 1FL (or 1FR). This pressure reduction mode continues until the first variable Tp is reduced to zero.

In such a manner, the cylinder pressures PFL and PFR in the wheel cylinders 1FL and 1FR can be adjusted to the target cylinder pressure P*FL and P*FR, respectively. It is, therefore, possible to control the produced or actual yaw rate to an optimum yaw rate that is calculated based upon the vehicle speed and steering angle. This is effective to provide an improved vehicle steering stability and an improved transient yaw rate characteristic.

The principles of a second embodiment of the invention will be described with reference to FIG. 6. The cornering powers Kf and Kr of the front and rear road wheels depend upon the braking and driving forces and this dependence is taken into account in this embodiment. These cornering powers are used in calculating the target cylinder pressures P*FL and P*FR during vehicle braking.

Figure 6:
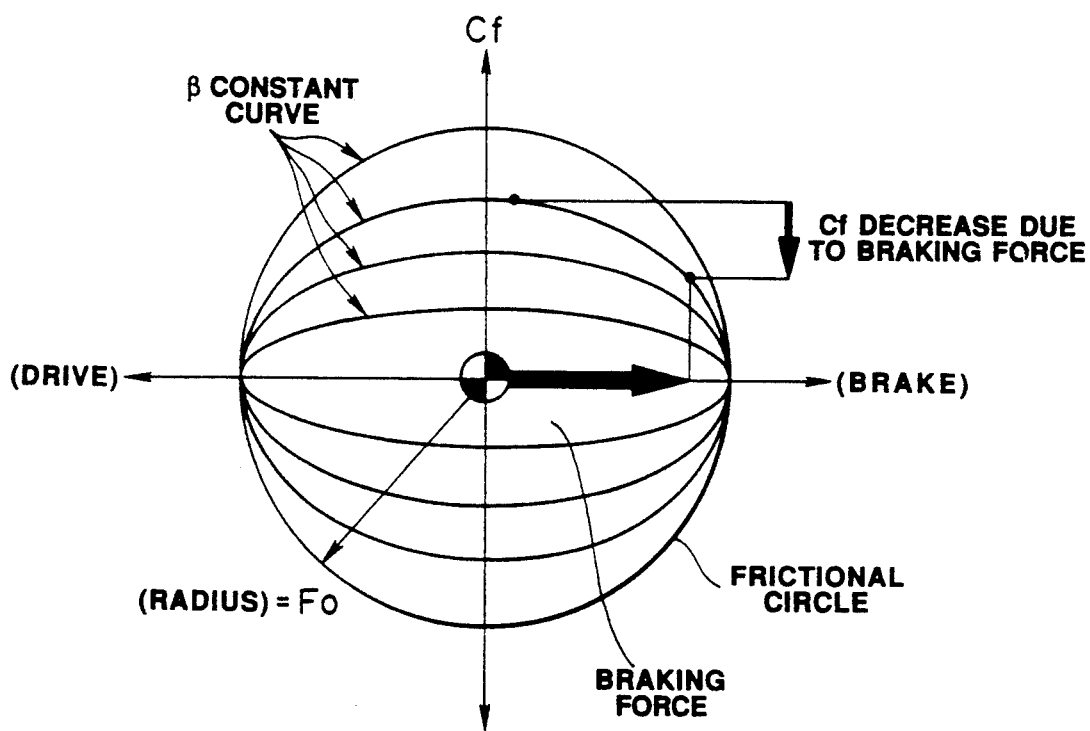
FIG. 6 is a diagram used explaining the principles of a second embodiment of the invention.

FIG. 6 shows a friction circle used to provide the concept of the relationship of the front wheel cornering force Cf with the braking and driving forces. Description will be made to the manner in which the cornering power Kf of the front wheels is calculated in the presence of vehicle braking.

Assuming now that the cornering force Cf of the front wheels is proportional to the lateral slip angle $\beta$, the following equation is given:

$$Cfmax = Fo = Kfo \cdot \beta max \quad (35)$$

where Fo is the maximum possible frictional force produced by the tire, Cfmax is the maximum value of the cornering force Cf, $\beta$max is the lateral slip angle $\beta$ when the cornering force Cf is at the maximum value Cfmax. The maximum cornering force value Cfmax upon application of a braking force Bf is given by $$Cf\text{max} = \sqrt{Fo^2 - Bf^2} \quad (36)$$

$$= Fo\sqrt{1 - \left(\frac{Bf}{Fo}\right)^2}$$

$$= \left\{Kfo\sqrt{1 - \left(\frac{Bf}{Fo}\right)^2}\right\}\beta\text{max}$$

Thus, the cornering power Kf of the front wheels upon application of the braking force Bf is given by $$Kf = Kfo\sqrt{1 - \left(\frac{Bf}{Fo}\right)^2} \quad (37)$$

Assuming that the front wheel cornering power Kf is the average value of the cornering powers of the left and right front road wheels, the front wheel cornering power Kf upon application of braking forces BFL and BFR to the left and right front wheels, respectively, is given by $$Kf = \frac{Kfo}{2}\left\{\sqrt{1 - \left(\frac{BFR}{Fo}\right)^2} + \sqrt{1 - \left(\frac{BFL}{Fo}\right)^2}\right\} \quad (38)$$

Similarly, the cornering power Kf of the rear wheels upon application of the braking force Br is given by $$Kr = Kro\sqrt{1 - \left(\frac{Br}{Fo'}\right)^2} \quad (39)$$

where Fo' is the maximum possible frictional force produced by the rear wheels and Kro is the rear wheel cornering power in the absece of vehicle braking. Substituting Equation (23) into Equations (38) and (39) gives $$Kf = \quad (40)$$

$$\frac{Kfo}{2}\left\{\sqrt{1 - \left(\frac{kp \cdot PFR}{Fo}\right)^2} + \sqrt{1 - \left(\frac{kp \cdot PFL}{Fo}\right)^2}\right\}$$

$$Kr = Kro\sqrt{1 - \left(\frac{kp \cdot Pr}{Fo'}\right)^2} \quad (41)$$

Figure 7:
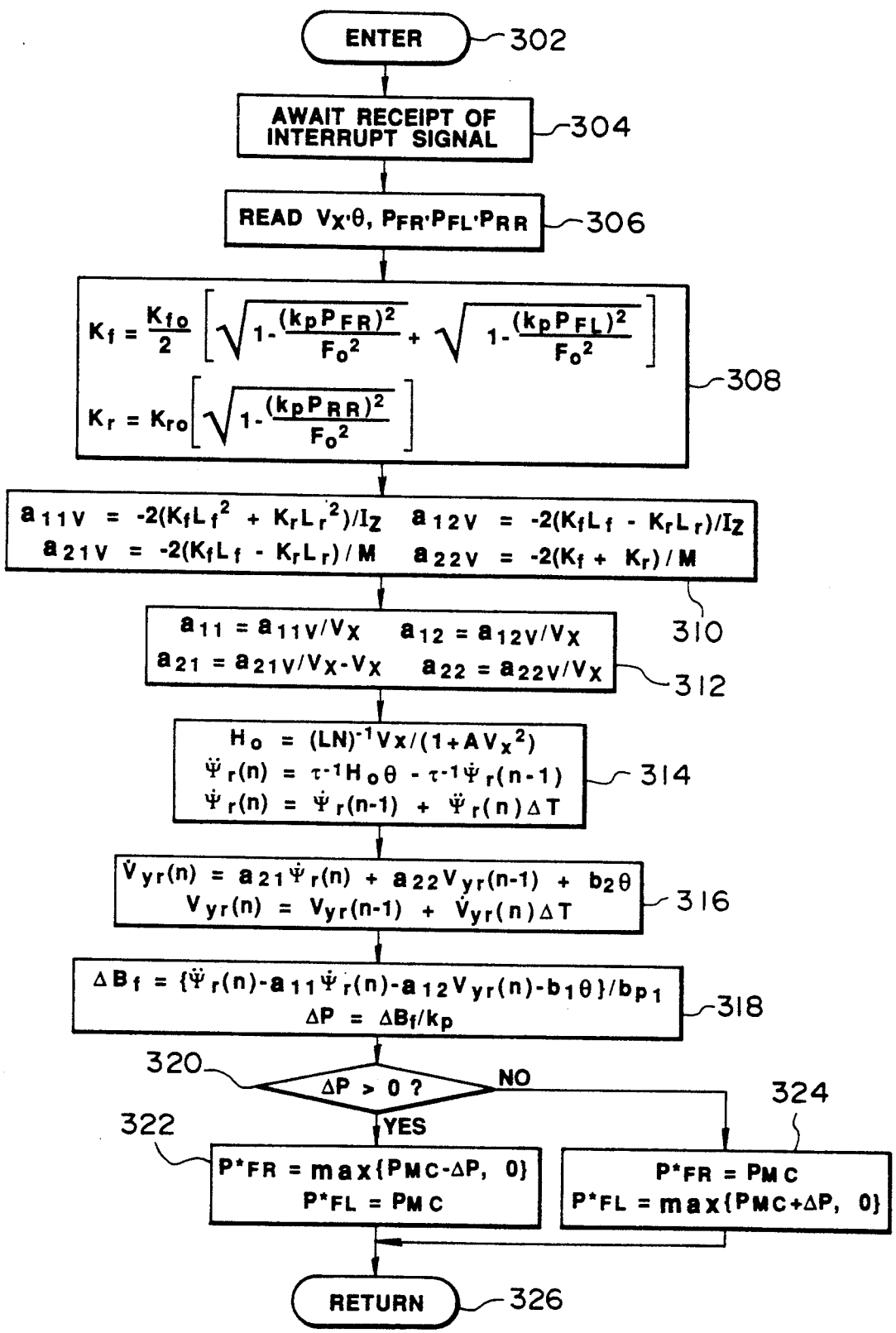
FIG. 7 is a flow diagram showing the programming of the digital computer as it is used in the second embodiment to calculate target values for the fluid pressures supplied to the wheel cylinders.

FIG. 7 is a flow diagram illustrating the programming of the digital computer as it is used in the second embodiment to calculate target values P*FL(t) and P*FR(t) for the fluid pressures to be supplied to the wheel cylinders 1FL and 1FR.

The computer program is entered at the point 302. At the point 304 in the program, the central processing unit 19c awaits the receipt of an interrupt signal produced at uniform interval of time ΔT (for example, 5 msec). After the receipt of this interrupt signal, at the point 306 in the program, the steering angle θ, the vehicle speed Vx, the cylinder pressures PFL and PFR and the cylinder pressure PRR are read into the computer memory 19d. At the point 308 in the program, the front- and rear-wheel cornering powers Kf and Kr are calculated from Equations (39) and (40). Upon completion of these calculations, the program proceeds to the point 310 where the calculated cornering powers Kf and Kr are used to calculate coefficients a11V, a12V, a21V and a22V from Equations (28), (29), (30) and (31).

At the point 312 in the program, coefficients a11, 1a2, a21 and a22 are calculated, from Equations (8) to (11), as a11=a11V/Vx, a12=a12V/Vx, a21=a21V/Vx−Vx and a22=a22V/Vx. At the point 312 in the program, the steady yaw rate gain Ho is calculated, from Equation (17), based upon the vehicle speed Vx, the stability factor A calculated from Equation (18), the wheel base L and the steering gear ratio N. The calculated steady yaw rate gain Ho is used to calculate the differentiated value r(n) of the target yaw rate from Equation (19). Furthermore, the present target yaw rate ψr(n) is calculated, from Equation (32), based upon the new differentiated yaw rate value ψr(n) calculated in the present cycle of execution of this program and the last differentiated yaw rate value ψr(n−1) calculated in the last cycle of execution of the program. The calculated target yaw rate value ψr(n) is used to update the last target yaw rate value stored in the computer memory 19d.

At the point 316 in the program, the lateral acceleration Vyr(n) is calculated, from Equation (21), based upon the coefficients a21 and a22 calculated at the step 312, a coefficient b2 calculated previously from Equation (13), the target yaw rate ψr(n) calculated at the step 314, and the last lateral speed value Vyr(n−1). The calculated lateral acceleration value Vyr(n) is used along with the last lateral speed value Vyr(n−1) to calculate the present lateral speed Vyr(n) from Equation (33). The calculated lateral speed value Vyr(n) is used to update the last lateral speed value stored in the computer memory 19d.

At the point 318 in the program, the difference ΔBf between the braking forces applied to the left and right front wheels from Equation (22). The calculated braking force difference value ΔBf is used, along with the coefficient kp calculated previously from Equation (24), to calculate a target pressure difference value ΔP from Equation (25).

At the point 320 in the program, a determination is made as to whether or not the calculated target pressure difference value ΔP is positive. If ΔP>0, then the program proceeds to the point 322. Otherwise, the program proceeds to the point 324.

At the point 322 in the program, the master cylinder pressure PMC is set for the target cylinder pressure P*FL to be supplied to the wheel cylinder 1FL and a greater one of "0" and the difference (PMC−ΔP) between the master cylinder pressure PMC and the target pressure difference ΔP) is set for the target cylinder pressure P*FR to be supplied to the wheel cylinder 1FR. Following this, the program proceeds to the point 326 where the computer program returns to the entry point 302 to await the receipt of the next interrupt signal.

At the point 324 in the program, the master cylinder pressure PMC is set for the target cylinder pressure P*FR to be supplied to the wheel cylinder 1FR and a greater one of "0" and the difference (PMC−ΔP) between the master cylinder pressure PMC and the target pressure difference ΔP) for the target cylinder pressure P*FL to be supplied to the wheel cylinder 1FL. Following this, the program proceeds to the point 326 where the computer program returns to the entry point 302 to await the receipt of the next interrupt signal.

The coefficients or parameters a11, a12, a21, a22, b1 and b2, which are used in calculating the lateral acceleration Vyr(n) and the braking force difference ΔBf, are dependent upon the cornering powers Kf and Kr. In the second embodiment, the cornering powers Kf and Kr vary according to the fluid pressures supplied to the respective wheel cylinders 1FL, 1FR, 1RL and 1RR to correct an error between the vehicle model and the actual vehicle. It is, therefore, possible to calculate target cylinder pressures P*FL and P*FR with greater accuracy. This is effective to provide an improved vehicle steering stability and an improved transient yaw rate characteristic.

The principles of a third embodiment of the invention will be described with reference to FIG. 6 which shows a tire friction circle used in explaining the concept of the relationship of the front and rear cornering forces Cf and Cr with the braking or driving forces. The tire can produces a maximum friction force indicated by the radius Fo of the tire friction circle. In the third embodiment, the radius Fo of the tire friction circle of FIG. 6 is varied based upon a wheel load shift resulting from brake application.

Assuming now that Fo is an already-known value of the radius of a tire friction circule provided for a front wheel when the vehicle is at rest, Cfmax is the maximum cornering force provided when the whole type friction force is produced laterally, and $P_{LKFO}$ is a wheel cylinder pressure, the whole wheel cylinder pressure being used to brake the front wheel, the relationship between the radius Fo of the front wheel friction circle and the maximum cornering force Cfmax are represented by Equation (35).

The relationship between the wheel cylinder pressure PLKFO and the radius Fo of the front wheel friction circle is given by $$Fo = Kp \times P_{LKFO} \quad (42)$$

where kp is the constant used in Equation (24) and the wheel inertia moment is ignored.

Considering the front wheel friction circle radius Fo, the cornering power Kfo, the constant Kp and the wheel cylinder pressure $P_{LKFO}$ to be already-known values, the friction circula radius F during braking, the wheel cylinder pressure $P_{LKF}$ provided when the maximum braking force is produced and the cornering power Kf2 during braking are calculated.

When braking is applied to the vehicle, a load shift occurs to the front wheel, The load shift ΔM for each wheel is given by $$\Delta M = M \times h \times g / (L \times 2) \quad (43)$$

where M is the weight of the vehicle, h is the height of the gravity center of the vehicle, L is the wheel base, and g is the rate of decrease of the vehicle speed.

Assuming that the road surface condition is constant, the friction circle radius F is directly proportional to the load (referred to as wheel load) of the wheel contacting with the road surface. Thus, when the load shift given by Equation (44) occurs, the friction circle radius F is given by $$F = Fo \times (1 + \Delta M / Mfo) \quad (44)$$

where Mfo is the front wheel load when the vehicle is at rest and given by $$Mfo = M \times Lr / (L \times 2) \quad (45)$$

where Lr is the distance of the center between the front wheels with respect to the rear wheels.

Assuming that the wheel lateral slip angle βmax provided at the maximum cornering force Cfmax is constant regardless of the wheel load, the cornering power is directly proportional to the wheel load. Thus, the cornering power Kf1, which is the cornering power Kf when the load shift occurs, is given by $$Kf1 = Kfo \times (1 + \Delta M / Mfo) \quad (46)$$

Similarly, the wheel cylinder pressure $P_{LKF}$ provided at the maximum braking force is given by $$P_{LKF} = P_{LKFO} \times (1 + \Delta M / Mfo) \quad (47)$$

As can be seen from FIG. 6, the maximum cornering force value Cfmax upon application of a braking force Bf is given by $$\begin{aligned} Cfmax &= \sqrt{F^2 - Bf^2} \\ &= Kfo \times \left(1 + \frac{\Delta M}{Mfo}\right) \sqrt{1 - \left(\frac{Bf}{F}\right)^2} \times \beta max \end{aligned} \quad (48)$$

Thus, the cornering power Kf2 of the front wheels upon application of the braking force Bf is given by $$Kf2 = Kfo \times \left(1 + \frac{\Delta M}{Mfo}\right) \sqrt{1 - \left(\frac{Bf}{F}\right)^2} \quad (49)$$

Using the braking forces $B_{FL}$ and $B_{FR}$ applied to the left and right front wheels, the average value Kf2 of the cornering powers Kf2 of the left and right front wheels is given by $$Kf2 = \frac{Kfo}{2} \times \left(1 + \frac{\Delta M}{Mfo}\right) \times \left\{ \sqrt{1 + \left(\frac{BFR}{F}\right)^2} + \sqrt{1 + \left(\frac{BFL}{F}\right)^2} \right\} \quad (50)$$

Substituting Equations (42) and (47) into Equation (50) gives $$Kf2 = \frac{Kfo}{2} \times \left\{ \sqrt{\left(1 + \frac{\Delta M}{Mfo}\right)^2 + \left(\frac{PFR}{PLKFO}\right)^2} + \sqrt{\left(1 + \frac{\Delta M}{Mfo}\right)^2 - \left(\frac{PFL}{PLKFO}\right)^2} \right\} \quad (51)$$

Similarly, the cornering power Kr2 produced when a wheel cylinder pressure $P_{RR}$ is applied to the rear wheels is given by $$Kr2 = Kfo \sqrt{\left(1 - \frac{\Delta M}{Mro}\right)^2 - \left(\frac{PRR}{PLKRO}\right)^2} \quad (52)$$

Referring to FIG. 8, there is shown a schematic diagram of a braking force control apparatus used in the third embodiment of the invention. The braking force control apparatus is substantially the same as the braking force control apparatus of the first embodiment except that the control unit 16 is connected to a longitudinal acceleration sensor 15. Accordingly, like reference numerals have been applied to FIG. 8 with respect to the equivalent components shown in FIG. 2. The longitudinal acceleration sensor 15 is provided to sense vehicle longitudinal deceleration and producing a signal indicative of a sensed vehicle longitudinal deceleration to the input interface 19a of the control unit 16.

FIG. 9 is a flow diagram illustrating the programming of the digital computer as it is used in the third embodimet to calculate target values P*FL(t) and P*FR(t) for the fluid pressures to be supplied to the wheel cylinders 1FL and 1FR.

The computer program is entered at the point 402. At the point 404 in the program, the central processing unit 19c awaits the receipt of an interrupt signal produced at uniform interval of time $\Delta T$ (for example, 5 msec). After the receipt of this interrupt signal, at the point 406 in the program, the steering angle $\theta$, the vehicle speed Vx, the longitudinal deceleration g, the cylinder pressures PFL and PFR and the cylinder pressure PRR are read into the computer memory 19d. At the point 408 in the program, the wheel load shift $\Delta M$ is calculated from Equation (43). At the point 410 in the program, the front- and rear-wheel cornering powers Kf and Kr are calculated from Equations (51) and (52). Upon completion of these calculations, the program proceeds to the point 412 where the calculated cornering powers Kf and Kr are used to calculate coefficients a11V, a12V, a21V and a22V from Equations (28), (29), (30) and (31).

At the point 414 in the program, coefficients a11, 1a2, a21 and a22 are calculated, from Equations (8) to (11), as a11=a11V/Vx, a12=a12V/Vx, a21=a21V/Vx−Vx and a22=a22V/Vx. At the point 416 in the program, the steady yaw rate gain Ho is calculated, from Equation (17), based upon the vehicle speed Vx, the stability factor A calculated from Equation (18), the wheel base L and the steering gear ratio N. The calculated steady yaw rate gain Ho is used to calculate the differentiated value $\dot{\psi}r(n)$ of the target yaw rate from Equation (19). Furthermore, the present target yaw rate $\psi r(n)$ is calculated, from Equation (32), based upon the new differentiated yaw rate value $\dot{\psi}r(n)$ calculated in the present cycle of execution of this program and the last differentiated yaw rate value $\dot{\psi}r(n-1)$ calculated in the last cycle of execution of the program. The calculated target yaw rate value $\psi r(n)$ is used to update the last target yaw rate value stored in the computer memory 19d.

At the point 418 in the program, the lateral acceleration Vyr(n) is calculated, from Equation (21), based upon the coefficients a21 and a22 calculated at the step 414, a coefficient b2 calculated previously from Equation (13), the target yaw rate $\psi r(n)$ calculated at the step 416, and the last lateral speed value Vyr(n−1). The calculated lateral acceleration value Vyr(n) is used along with the last lateral speed value Vyr(n−1) to calculate the present lateral speed Vyr(n) from Equation (33). The calculated lateral speed value Vyr(n) is used to update the last lateral speed value stored in the computer memory 19d.

At the point 420 in the program, the difference $\Delta$Bf between the braking forces applied to the left and right front wheels from Equation (22). The calculated braking force difference value $\Delta$Bf is used, along with the coefficient kp calculated previously from Equation (24), to calculate a target pressure difference value $\Delta$P from Equation (25).

At the point 422 in the program, a determination is made as to whether or not the calculated target pressure difference value $\Delta$P is positive. If $\Delta$P>0, then the program proceeds to the point 424. Otherwise, the program proceeds to the point 426.

At the point 424 in the program, the master cylinder pressure PMC is set for the target cylinder pressure P*FL to be supplied to the wheel cylinder 1FL and a greater one of "0" and the difference (PMC−$\Delta$P) between the master cylinder pressure PMC and the target pressure difference $\Delta$P) is set for the target cylinder pressure P*FR to be supplied to the wheel cylinder 1FR. Following this, the program proceeds to the point 428 where the computer program returns to the entry point 402 to await the receipt of the next interrupt signal.

At the point 426 in the program, the master cylinder pressure PMC is set for the target cylinder pressure P*FR to be supplied to the wheel cylinder 1FR and a greater one of "0" and the difference (PMC−$\Delta$P) between the master cylinder pressure PMC and the target pressure difference $\Delta$P) for the target cylinder pressure P*FL to be supplied to the wheel cylinder 1FL. Following this, the program proceeds to the point 428 where the computer program returns to the entry point 402 to await the receipt of the next interrupt signal.

The coefficients or parameters a11, a12, a21, a22, b1 and b2, which are used in calculating the lateral acceleration Vyr(n) and the braking force difference $\Delta$Bf, are dependent upon the cornering powers Kf and Kr. In addition, the friction circle radius F is dependent upon the wheel load. In the third embodiment, the cornering powers Kf and Kr vary according to the fluid pressures supplied to the respective wheel cylinders 1Fl, 1FR, 1RL and 1RR to correct an error between the vehicle model and the actual vehicle. It is, therefore, possible to calculate target cylinder pressures P*FL and P*FR with greater accuracy. This is effective to provide an improved vehicle steering stability and an improved transient yaw rate characteristic.

Although the invention has been described in connection with a yaw rate control performed only in the presence of vehicle braking, it is to be understood that the invention is not limited in any way to such a braking force control. For example, a traction control actuator may be employed to provide a yaw rate characteristic control also in the absence of vehicle braking.

Although the invention has been described in connection with a braking force difference control only for the front wheels of the vehicle, it is to be understood that the invention is equally applicable to control the braking force difference for the left and right ones of the front and/or rear wheels.

Although a steering angle sensor 11 is used to detect a vehicle steering condition, it is to be understood that the vehicle steering condition may be detected by means of an actual steering sensor adapted to sense the actual steering angle of a road wheel. In this case, the steering gear ratio N used in Equations (3), (12) and (13) may be omitted. Although a vehicle speed sensor 12 is used to detect a vehicle longitudinal speed, it is to be understood that the vehicle longitudinal speed may be inferred from road wheel speed, vehicle longitudinal acceleration or the like.

Although the invention has been described in connection with a control unit 16 employing a digital computer, it is to be understood that the invention is not limited in any way to such a control unit. For example, the control unit 16 may be a combination of electric circuits including comparator circuits, logic circuits, etc.

What is claimed is:

1. A braking force control apparatus for use with an automotive vehicle supported on a pair of front wheels and a pair of rear wheels, comprising:

means for controlling braking forces to be applied to the wheels of at least one of the wheel pairs;

first sensor means for sensing a vehicle steering angle and for producing a first signal indicative of the sensed vehicle steering angle;

second sensor means for sensing a vehicle longitudinal speed and for producing a second signal indicative of the sensed vehicle longitudinal speed;

a control unit coupled to the first and second sensor means for receiving the first and second signals, the control unit including means for calculating a target yaw rate value which has a first order lag to the steering angle based upon the sensed vehicle steering angle and the sensed vehicle longitudinal speed, means for calculating a target difference between the braking forces from a vehicle model specifying a target braking force difference as a function of target yaw rate, vehicle steering angle and vehicle longitudinal speed, the vehicle model being derived from equations of motions of the vehicle, and means for setting the braking force control means to provide the calculated target braking force difference so as to provide the calculated target yaw rate value.

2. The braking force control apparatus as claimed in claim 1, wherein the vehicle has a first degree of freedom providing a yaw motion of the vehicle and a second degree of freedom providing a lateral motion of the vehicle, and wherein the vehicle model is derived from an equation of yaw motion of the vehicle and an equation of lateral motion of the vehicle.

3. The braking force control apparatus as claimed in claim 1, wherein the vehicle model has parameters related to cornering powers of the respective wheels.

4. The braking force control apparatus as claimed in claim 3, further comprising third sensor means for sensing braking forces applied to the respective wheels and for producing signals indicative of the sensed braking forces, and means for varying the parameters according to the sensed braking forces.

5. The braking force control apparatus as claimed in claim 4, further comprising fourth sensor means for sensing a vehicle longitudinal deceleration and for producing signals indicative of the sensed vehicle longitudinal deceleration, and means for varying the parameters according to the sensed vehicle longitudinal deceleration.

* * * * *